April 26, 1960 R. A. HIGONNET ET AL 2,933,990
SPACING DEVICE

Filed June 8, 1956 2 Sheets-Sheet 1

INVENTORS
RENE A. HIGONNET
LOUIS M. MOYROUD
BY
ATTORNEYS

April 26, 1960  R. A. HIGONNET ET AL  2,933,990
SPACING DEVICE
Filed June 8, 1956  2 Sheets-Sheet 2
Fig. 3
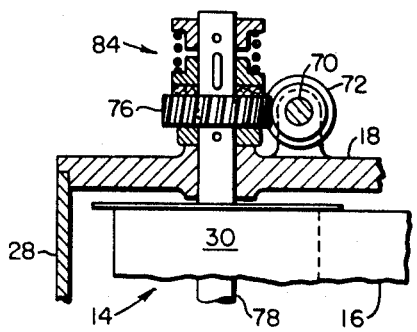
Fig. 5
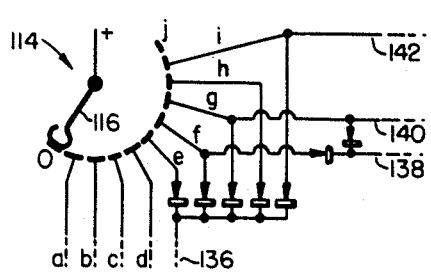
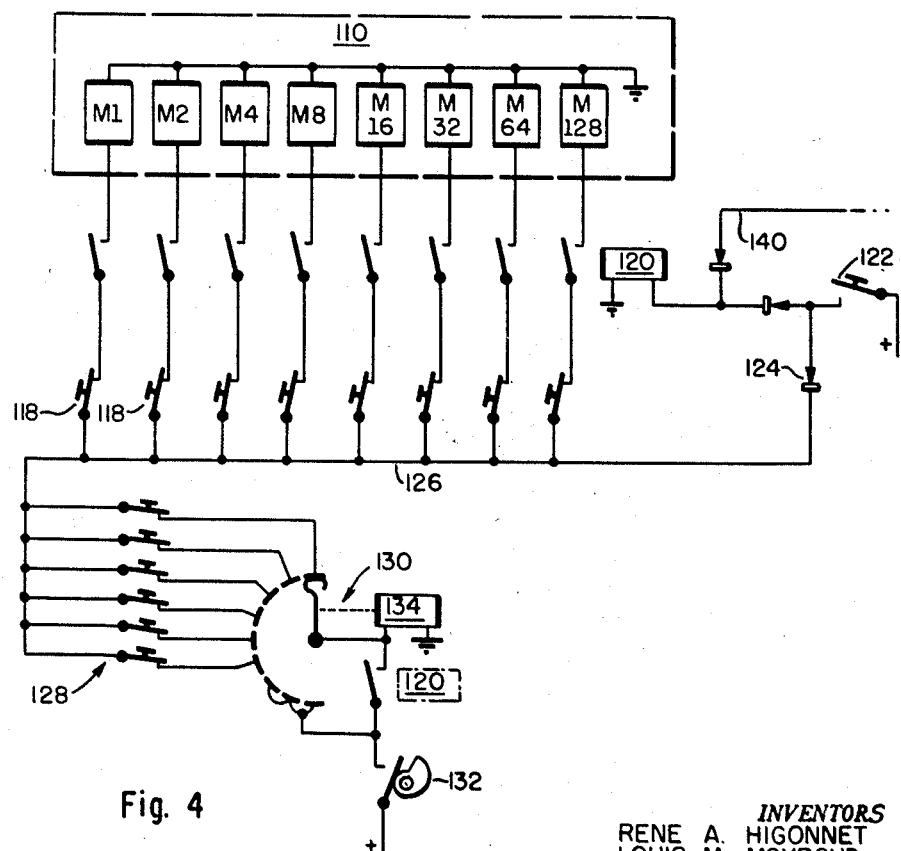
Fig. 4
INVENTORS
RENE A. HIGONNET
LOUIS M. MOYROUD
BY
ATTORNEYS

United States Patent Office 2,933,990
Patented Apr. 26, 1960

---

2,933,990

SPACING DEVICE

Rene A. Higonnet, Cambridge, and Louis M. Moyroud, West Medford, Mass., assignors to Graphic Arts Research Foundation, Inc., Cambridge, Mass., a corporation of Delaware Application June 8, 1956, Serial No. 590,306

Claims priority, application Great Britain August 2, 1955

6 Claims. (Cl. 95—4.5)

The present invention relates to spacing mechanisms, and more particularly to mechanisms suitable for feeding sensitized film in photographic type composing apparatus.

An object of the invention is to provide means for spacing the characters in a line of type, and also for spacing the successive lines in a page.

Another object is to provide mechanism for handling sensitized film in the form of a roll, with character spacing being accomplished in the direction transverse to the direction of film feed and line spacing being accomplished by feeding the film, or vice versa.

A further object is to provide means for reversing the direction of film feed.

A still further object is to provide simplified apparatus for accomplishing the above spacing operations with accuracy of a high order.

With the foregoing and other objects in view, the features of the invention include novel roll film feeding mechanism having means to reverse the direction of feed.

Another feature resides in the use of a single variable escapement to accomplish both character spacing and line spacing, with suitable controls for connecting the said escapement alternatively with the character and line spacing mechanisms. By this means, we achieve considerable simplicity of construction and economy of manufacture, while retaining a high order of accuracy in spacing, as is necessary in the art of type composition.

Another feature resides in provision for housing the film in a demountable light-tight magazine, with provision for accurate registration of the magazine on the body of the composing machine. The composing machine houses a part of the feeding mechanism and the variable escapement necessary to accomplish the ends heretofore mentioned.

Other features of the invention reside in certain features of construction, arrangements of the parts and modes of operation that will become clear from the following description of a preferred embodiment thereof, and from the appended drawings illustrating the same, in which Fig. 1 is a side elevation in section of the line spacing mechanism with certain related controls and other parts for connecting said mechanism with a variable escapement;

Fig. 3 is an elevation in section taken on line 3—3 of Fig. 1 showing details of the film feeding mechanism;

Fig. 4 is a circuit diagram showing a circuit for actuating the variable escapement; and Fig. 5 is a circuit diagram of a sequence timing and control switch connected with the various parts of the apparatus as shown and described.

Figure 1:
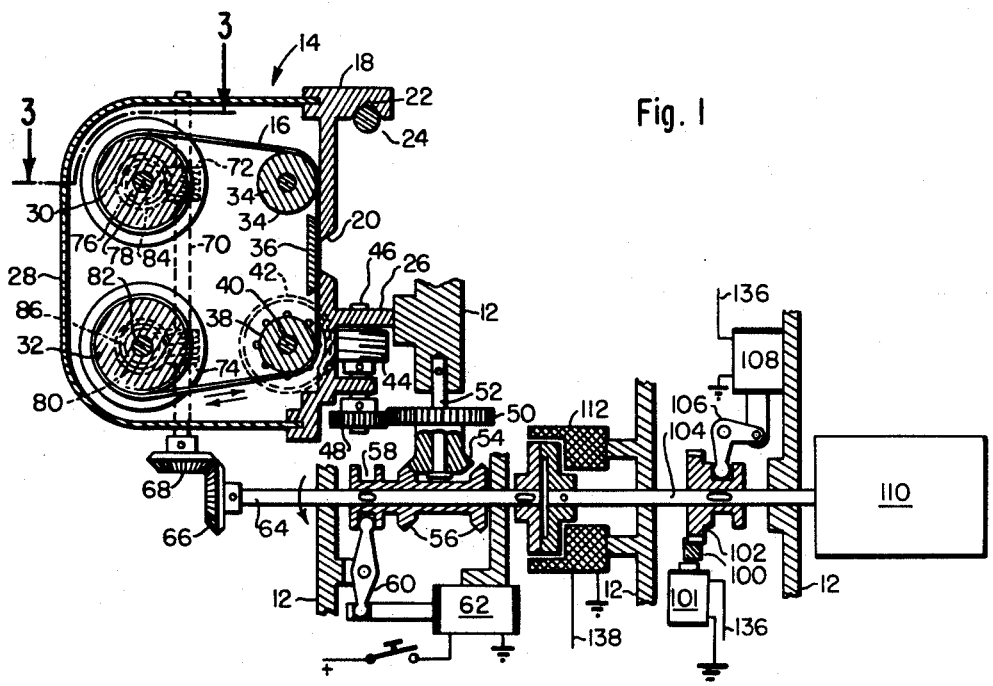

Referring to Fig. 1, there is provided a rigid frame 12, which may be the frame of a photographic type composing apparatus of the general type shown and described in our copending application Serial No. 770,320, filed August 23, 1947, now patent No. 2,790,362. This machine is intended for the composition of text matter directly on a piece of sensitized film without the intermediate use of lead casting apparatus.

A film magazine 14 providing a light-tight enclosure for a roll of film 16 is adapted to be accurately and detachably mounted upon the frame 12. The magazine has a rigid frame portion 18 having a window 20 for exposure of the film. The frame 18 also has a V-groove 22 adapted to be rested accurately over a bar 24 secured to the frame 12, and a lug 26 adapted to bear accurately upon an abutment of the frame 12. The combination of the V-groove suspension and the lug 26 provides accurate means for locating the film in relation to the character projection apparatus hereinafter more fully described.

The magazine is provided with a cover 28 which completely encloses the film. Within the magazine are rotatably supported a feed spool 30 and a takeup spool 32. The film is arranged to pass from the feed spool 30 over an idler spool 34, past a presser plate 36 resiliently supported adjacent the window 20, over a feed sprocket 38, and on to the takeup spool 32. The film is provided with suitable sprocket holes on one or both margins to receive the teeth of the sprocket 38. The sprocket 38 is mounted upon a shaft 40 to which is pinned a worm wheel 42. The wheel 42 engages with a worm 44 pinned to a shaft 46 rotatably supported in the frame 18 externally of the film housing. The shaft 46 also has a pinion 48 pinned thereto which engages a pinion 50 pivotally supported upon a fixed stud shaft 52. A bevel gear 54 is secured to the pinion 50 and is adapted to engage alternatively one or the other of a pair of integral gears 56 comprising a reversing mechanism. An extension of the gears 56 includes a grooved portion 58 in which rides an arm 60 supported on a fixed pivot and adapted to be rotated by the armature of a magnet 62. The gear member 56 is keyed to a shaft 64 with freedom to slide longitudinally thereon. The feeding of the film from one spool to the other is accomplished by the application of torque to the shaft 64 which, through the reversing mechanism just described, turns the spocket 38.

This same shaft 64 also supplies power for a friction drive on the feed and takeup spools. A pair of bevel gears 66 and 68 connect the shaft 64 with a shaft 70 to which are pinned a pair of worms 72 and 74. (See also Fig. 3.) The worms 72 and 74 engage, respectively, a worm gear 76 pinned on a shaft 78 and worm gear 80 pinned on a shaft 82. Friction drives 84 and 86 couple the shafts 78 and 82 with the spools 30 and 32, respectively. The friction drive 84 is stronger than the drive 86 so as to take up backlash in the feeding mechanism in the same direction at all times.

The worms 72 and 74 are arranged to rotate the spools 30 and 32 in opposing directions, that is, each in the appropriate direction tending to cause it to take up the film 16. Thus the film may be fed in either direction by appropriately energizing or deenergizing the magnet 62 which determines the direction of turning of the drive sprocket 38. Such feeding is accomplished in either case by moving the film in opposition to one or the other of the friction drives 84 or 86, and the film 16 is thus continuously under tension.

For the purpose of the description to follow, it may be assumed that the direction of film feeding for spacing between the successive lines of type composition is from the feed spool 30 to the takeup spool 32. It may be further assumed that the reversible drive for the sprocket 38 is illustrated in the corresponding position with the magnet 62 deenergized.

Apparatus for projecting the characters in a line upon the film through the window 20 is illustrated in Fig. 4.

This mechanism is substantially similar to that described in Patent 2,670,665 to Caldwell, and includes a continuously rotating character disc 88, an intermittent flash device 90, a stationary collimating lens 92, and a sliding carriage 94 including a converging lens 96 to form the images on the film 16 and a right angle reflector element 98. The sliding carriage 94 is secured to a rack 100 slidably received in the frame 12. A magnet 101 may be energized to hold the rack in any desired position. A pinion 102 is received on a shaft 104 (see also Fig. 1) so that it may slide longitudinally with respect thereto; but it is also keyed to the shaft so as to prevent rotation of the pinion relatively thereto. The pinion has a grooved extension in which is received a lever 106, an arm of which is pivotally secured to the armature of a magnet 108.

The shaft 104 extends from a variable escapement 110, here shown in block form. The variable escapement mechanism may be of any suitable type, but it is preferably of the differential gear form shown and described in our copending application Serial No. 590,304, filed on even date herewith. When the magnet 108 is deenergized the pinion 102 is engaged with the rack 100; and when the magnet 108 is energized the pinion 102 is moved out of engagement with the rack. As illustrated, the shaft 104 is continuously engaged with the variable escapement, and it is preferably the output shaft of the highest order stage in the binary differential mechanism of said last-mentioned application.

Engagement of the shaft 104 with the shaft 64 is accomplished by means of a clutch magnet 112 which causes engagement when energized. The particular form of clutch shown is merely illustrative, and may be replaced by any other suitable clutch means known to the art.

It will be appreciated from the foregoing description that a single variable escapement mechanism has been provided, the said escapement having a shaft 104 which may be coupled alternatively with the shaft 64 or with the rack 100. Such connections are always alternative since character spacing and line spacing operations are not produced simultaneously in type composition.

The operation of the above-described apparatus is under the control of a stepping switch 114 (Fig. 5) having a brush 116 which rotates in a counterclockwise direction from a position 0 through positions a to j. (Other positions of the switch pertain to other operations of the machine that may be disregarded for purposes of the present description.)

As described in said application Serial No. 770,320, the characters in a given line of type are selected by the machine operator on a keyboard, and the keyboard is connected with a suitable register or memory device which stores information corresponding to each selected character and word space. A justifier is also actuated to compute the additional increments to be inserted at selected positions in the line in order to justify it. Once the line has been registered, the characters are transcribed onto the film in justified spacing by suitable means which are actuated by the information in the register, first, to time the moments of energization of the flash device 90, and second, to energize the variable escapement after each flash of light to space the succeeding character images according to their respective widths and the widths of word spaces or justification increments to be inserted. Apparatus for the foregoing purposes is not described in detail herein since it forms no part of the present invention and is adequately described in the above-mentioned applications.

Figure 2:
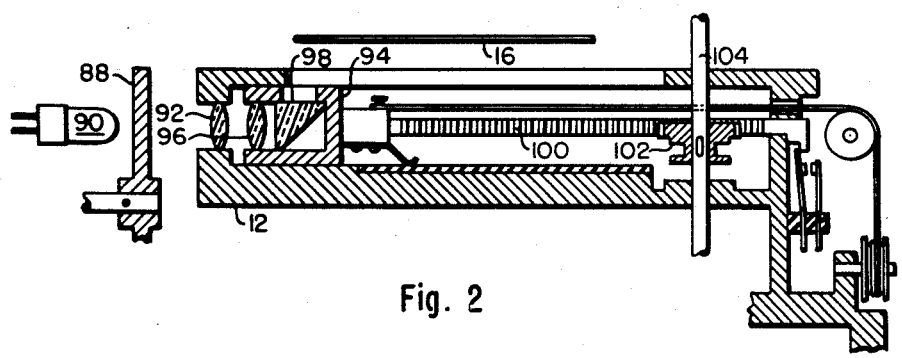
Fig. 2 is an elevation in section of the character spacing mechanism.

The apparatus of Figs. 1, 2 and 5 is illustrated in the condition that obtains at the start of transcription of a registered line. The magnet 108 is deenergized, whereby the pinion 102 is engaged with the rack 100 and the magnet 112 is de-energized to disengage the shaft 64 of the film feeding mechanism from the shaft 104 extending from the variable escapement 110. As described in said application Serial No. 590,304 filed on even date herewith, the variable escapement is provided with input magnets M1 to M128 (Fig. 4), which are the input magnets arranged in binary order for energization in selected combinations according to the widths of spacing desired. We show a set of manually-operated keys 118 for determining, for each separate character, word space or justification increment, the combination of magnets to be energized. It will be understood, however, that these keys are in reality the contacts of suitable relays energized by the register as described in said application Serial No. 770,320. However, connection of the variable escapement magnets with the keys requires energization of a relay 120. This relay is energized through closure of a key 122. The key 122 may be replaced by automatically operated contacts closed alternately with the energization of the flash device 90.

The circuit for energizing the magnets M1 to M128 passes through the key 122 and a rectifier 124 to a lead 126 connected with the keys 118. The transcription proceeds in step-by-step fashion, with the carriage 94 carrying the reflector 98 moving along the window 20 of the film magazine 14 as the characters are successively projected and spaced transversely of the principal dimension of the roll of film 16.

After all of the characters in the line have been transcribed, the stepping switch 114 (Fig. 5) steps from position 0 to positions a, b, c and d in succession. Certain connections are closed by the switch in these positions to cause the variable escapement 110 to return the sliding carriage 94 to its original position for the next line of characters. The circuits and apparatus associated with these positions of the stepping switch 114 are shown and described in detail in said copending application Serial No. 590,304, filed on even date herewith, and are not further described herein. It is assumed for present purposes that when the switch 114 moves from position d to position e, the reflector carriage will have been returned to the left-hand margin as aforesaid and is ready to begin the spacing of the characters in the next line. However, prior to transcription of the next line, it is necessary to advance the film by an appropriate distance corresponding to the point size of the projected characters and the leading required. These operations are controlled by positions e through j of the stepping switch 114 as hereinafter described in detail.

During line spacing, the keys 18, which were closed in successive combinations corresponding to the character, word and increment spaces during the transcription of the characters, are closed by the machine operator in a combination representing the numerical value s/a, where s is the desired spacing between lines and a is an integer between 1 and 6. A group of keys 128 is provided, and the operator also closes a number of these keys equal to the digit a. The keys 128 are assumed to be left open during the transcription of the line, and to be closed as required after the transcription is completed and immediately before the feeding of the film as hereinafter described. A stepping switch 130 is also shown in the appropriate position for the start of the film feeding operation. A cam 132 continuously rotates to supply impulses to the contacts of the relay 120, these contacts leading to the brush of the switch 130 and also to a motor magnet 134 for the switch.

The feeding of the film is initiated when the stepping switch 114 reaches position e. In this position a voltage is connected to a wire 136 leading to the magnets 101 and 108 (Fig. 1). The magnet 101 holds the rack 100 in fixed position. The magnet 108 disengages the variable escapement 110 from the rack 100, and the rack is not re-engaged until the switch reaches position j.

Upon reaching position f, the switch 114 sends a voltage to a lead 138 to energize the clutch magnet 112 engaging the shaft 104 of the variable escapement 110 with the shaft 64 of the film feeding mechanism (Fig. 1). This engagement is continued through the following position of the switch 114.

Upon arrival in position g, the switch 114 sends a voltage to a lead 140 which energizes the magnet 120. Pulses generated by the cam 132 now pass through the closed contacts of the relay 120 to the brush and motor magnet 134 of the switch 130 and this switch steps rapidly through each of its positions, sending an impulse to the lead 126 through each of the keys 128 that has been closed. Thus the number of impulses reaching the lead 126 equals the number of the keys 128 that have been closed. (After reaching all of its illustrated positions, the switch 130 is returned to its original position by suitable homing means familiar to those skilled in the art and therefore not shown.) Thus the magnets M1 to M128 are energized once or several times in succession, each time in the same combination as determined by the keys 118. The total resultant escapement is therefore equal to the required space between the lines, and this is transmitted from the output shaft 104 of the variable escapement 110 to the shaft 64 of the line spacing mechanism. The necessary rotation is imparted to the sprocket wheel 38 for driving the film, and to the shaft 70 for operating the friction drives, as heretofore described in detail. Thus the line spacing is accomplished in one or more steps of variable size, and great precision is obtained due to the fact that relatively large angular displacements of the variable escapement are necessary to effect even small displacements of the film through the worm gear drive 42, 44. Upon arrival of the switch 114 in position h, the clutch magnet 112 is de-energized to disengage the film feeding mechanism from the variable escapement 110.

In position i of the switch 114, a lead 142 is energized. This lead is connected with apparatus not described herein but shown and fully described in said copending application Serial No. 590,304, filed on even date herewith, whereby the variable escapement is reset to an appropriate condition of each stage thereof for beginning the spacing of a new line of characters. More specifically, this involves setting each of the stages of the escapement to the 0 position in binary notation.

Upon reaching position j, the switch 114 de-energizes the magnets 101 and 108 by disconnecting the voltage from the lead 135 (Fig. 1), thereby allowing the pinion 102 to slide into engagement with the rack 100 and engaging the variable escapement 110 with the sliding carriage 94. The parts are thus returned to the initial positions assumed above.

From the foregoing description, it will be appreciated that there has been provided a simplified arrangement for spacing the characters and lines of type in photographic type composing apparatus, employing a single variable escapement for both purposes. Automatic sequence control means are provided for shifting the variable escapement from character spacing to line spacing automatically. There is also described a novel film drive adapted to be connected with the variable escapement, and including friction drives for the feed and takeup spools, whereby the film may be reversed through reversal of the direction of rotation of the drive sprocket 38 under the control of a magnet 62. Great precision is obtained in movements of the film for line spacing through provision of worm gear reductions connected with the variable escapement, and adjustment of the relative forces of the friction drives 84 and 86 to take up backlash in the same direction at all times.

It will be understood that while the invention has been described with reference to a preferred embodiment thereof, such modifications in the disclosed design, structure and arrangement of the parts as would occur to one skilled in the art upon a reading of the foregoing specification may be made thereupon without departing from the spirit and scope of the invention.

Having thus described the invention, we claim:

1. In type composing apparatus, the combination of means to support a sensitized sheet with a portion thereof in a printing position, means to project the images of the characters in a line of type successively in said position, a first mechanism for moving the sheet in one direction relatively to said printing position for spacing the characters, a second mechanism for moving the sheet at right angles to said direction for spacing lines, a variable escapement adapted to advance said first and second mechanisms by variable distances, and means for connecting the variable escapement alternatively with said first and second mechanisms.

2. In type composing apparatus, the combination of means to support a roll of sensitized film with a portion thereof in a printing position, means to project the images of the characters in a line of type successively in said position, a first mechanism for moving the film transversely of its principal dimension relatively to said printing position for spacing the characters, a second mechanism for moving the film along its principal dimension for spacing lines, a variable escapement adapted to advance said first and second mechanisms by variable distances, and means for connecting the variable escapement alternatively with said first and second mechanisms.

3. In type composing apparatus, the combination of means to support a roll of sensitized film with a portion thereof in a printing position, means to project the images of the characters in a line of type successively in said position, a first mechanism for moving the film transversely of its principal dimension relatively to said printing position for spacing the characters, a feed spool and a takeup spool for the film, drive means for spacing lines engageable with the film intermediate the feed and takeup spools, a variable escapement adapted to advance said first mechanism and drive means by variable distances, and means for connecting the variable escapement alternatively with said first mechanism and drive means.

4. In type composing apparatus, the combination of means to support a roll of sensitized film with a portion thereof in a printing position, means to project the images of the characters in a line of type successively in said position, a first mechanism for moving the film transversely of its principal dimension relatively to said printing position, a feed spool and a takeup spool for the film, drive means engageable with the film intermediate the feed and takeup spools, a variable escapement adapted to advance said first mechanism and drive means by variable distances, and means for connecting the variable escapement alternatively with said first mechanism and drive means.

5. In type composing apparatus, the combination of means to support a roll of sensitized film, means for projecting the characters in a line of type successively from a fixed position, intermittently movable means to reflect the images of said characters to successive positions arranged transversely of the principal dimension of the film, a feed spool and a takeup spool for the film, drive means engageable with the film intermediate the feed and takeup spools, a variable escapement adapted to advance said intermittently movable means and drive means by variable distances, and means for connecting the variable escapement alternatively with said movable means and drive means.

6. In type composing apparatus, the combination of means to support a roll of sensitized film, means for forming the images of characters in a line of type successively in a fixed position, movable means to reflect the images of said characters to successive positions arranged transversely to the principal dimension of the film, a feed spool and a takeup spool for the film, friction drives for the feed and takeup spools operative to take up the film in opposite directions, whereby the film is held under tension, drive means to feed the film, a variable escapement adapted to advance said movable means and drive means by variable distances, and means for connecting the variable escapement alternatively with said movable means and drive means.

References Cited in the file of this patent
UNITED STATES PATENTS

| | | |
|---|---|---|
| 636,062 | Richards | Oct. 31, 1899 |
| 1,166,504 | Webster | Jan. 4, 1916 |
| 1,237,239 | Bunnell | Aug. 14, 1917 |
| 2,478,555 | Yule | Aug. 9, 1949 |
| 2,487,476 | Pratt | Nov. 8, 1949 |
| 2,511,646 | Marmour | June 13, 1950 |
| 2,653,508 | Whiteley | Sept. 29, 1953 |
| 2,670,665 | Caldwell | Mar. 2, 1954 |